(12) United States Patent
Burdis et al.

(10) Patent No.: US 7,372,610 B2
(45) Date of Patent: May 13, 2008

(54) ELECTROCHROMIC DEVICES AND METHODS

(75) Inventors: Mark Samuel Burdis, Faribault, MN (US); Douglas Glenn John Weir, Northfield, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 0 days.

(21) Appl. No.: 11/359,664

(22) Filed: Feb. 22, 2006

(65) Prior Publication Data
US 2006/0209383 A1    Sep. 21, 2006

Related U.S. Application Data

(60) Provisional application No. 60/655,578, filed on Feb. 23, 2005.

(51) Int. Cl.
*G02F 1/15* (2006.01)

(52) U.S. Cl. ........................ 359/265; 359/270

(58) Field of Classification Search ............... 359/265, 359/245, 270, 290, 296, 297, 275, 248; 257/103
See application file for complete search history.

(56) References Cited

U.S. PATENT DOCUMENTS

| | | |
|---|---|---|
| 5,699,192 A | 12/1997 | Van Dine et al. |
| 6,859,297 B2 | 2/2005 | Lee et al. |
| 2004/0150867 A1 | 8/2004 | Lee et al. |
| 2004/0155263 A1* | 8/2004 | Giron ........................ 257/200 |
| 2006/0028730 A1* | 2/2006 | Varaprasad et al. ......... 359/604 |

OTHER PUBLICATIONS

Kaufman, H.R. et al., Sputtering, J. Vac. Sci. Techn. 21, 725 (1982).
Lee, Se-Hee et al., "A New Lithium Based Counter Electrochromic Material for Fast Optical Response," Electrochemical Society Proceedings vol. 96-24, pp. 191-205, San Antonio, TX (1996).
Lee, Se-Hee et al., "Raman spectroscopic studies of Ni—W oxide thin films," Solid State Ionics 140 (2001) 135-139.
Lee, S.-H. et al., "Electrochromic behavior of Ni—W oxide electrodes," Solar energy Materials and Solar Cells 39 (1995) 155-166.
Lee, Se-Hee et al., "Characterization of Ni—W oxide thin film electrodes," Solid State Ionics 109 (1998) 303-310.
Lee, Se-Hee et al., "Electrochromic mechanism in a-WO3-y thin films," Applied Physics Letters, American Institute of Physics (Jan. 11, 1999), pp. 242-244.
European Search Report, EP 06 00 3692, Dated May 9, 2006.
Passerini et al., "The Intercalation of Lithium in Nickel Oxide and its Electrochemical Properties" Journal of the Electrochemical Society, Electrochemcical Society, Manchester, New Hampshire, US, vol. 137, No. 10, pp. 3297-3300, Oct. 1, 1990.

* cited by examiner

*Primary Examiner*—Timothy Thompson
(74) *Attorney, Agent, or Firm*—Lerner, David, Littenberg, Krumholz & Mentlik, LLP

(57) ABSTRACT

A heat treated electrochromic device comprising an anodic complementary counter electrode layer comprised of a mixed tungsten-nickel oxide and lithium, which provides a high transmission in the fully intercalated state and which is capable of long term stability, is disclosed. Methods of making an electrochromic device comprising an anodic complementary counter electrode comprised of a mixed tungsten-nickel oxide are also disclosed.

21 Claims, 2 Drawing Sheets

ELECTROCHROMIC DEVICES AND METHODS

CROSS-REFERENCE TO RELATED APPLICATIONS

This application claims the benefit of the filing date of U.S. Provisional Patent Application No. 60/655,578 filed Feb. 23, 2005, the disclosure of which is hereby incorporated herein by reference.

BACKGROUND OF THE INVENTION

This invention relates to electrochromic devices which can vary the transmission or reflectance of electromagnetic radiation by application of an electrical potential to the electrochromic device.

Certain materials, referred to as electrochromic materials, are known to change their optical properties in response to the application of an electrical potential. This property has been taken advantage of to produce electrochromic devices which can be controlled to transmit optical energy selectively.

A number of factors affect the operation of an electrochromic device. One limitation on how dark an electrochromic device can become is how much charge can be stored in the counter electrode layer. There have been many different approaches for producing a charge storage medium, but most attention has focused on a thin film deposited parallel to the electrochromic material layer, and separated by an ionically conductive layer.

To date, most counter electrode layers have been made using NiO, LiNiO, or doped variants thereof. One advantage of using NiO and LiNiO materials is that under careful preparation conditions, the counter electrode can be made so that it displays anodic electrochromism with good efficiency and a high bleached state transmission. Unfortunately, it has been difficult to intercalate lithium into NiO based materials as a result of the material's compact crystalline structure. As such, higher voltages must be applied to such materials to intercalate lithium, which leads to undesirable side reactions.

Other methods employ proton coloration based mechanisms utilizing counter electrode layers comprised of vanadium oxides and other mixtures containing vanadium. Although it may be relatively easy to manufacture a counter electrode layer capable of coloring anodically in an aqueous medium, it is difficult to produce a complete device capable of long-term stability. It is, therefore, more advantageous to use lithium intercalation based systems.

A typical material used for counter electrode applications with lithium is vanadium oxide, which is a material that forms crystal structures similar to those seen in tungsten oxide systems. The open crystalline lattice of vanadium oxide allows lithium intercalation more readily than in NiO based structures. However, the presence of vanadium ions leads to the generation of a strong yellow color. This yellow color is only slightly modulated by lithium intercalation, and shows a reasonable cathodic electrochromic effect throughout the majority of the visible region, thus limiting the maximum transmission that can be achieved using this material as a counter electrode layer. Attempts to reduce the degree of coloration by doping vandadium oxides with other components result in a reduced electrochromic efficiency by reduction of the charge capacity of the counter electrode layer. Such doping results in a device with a higher bleached state transmission at the cost of a higher colored state transmission.

The problems associated with current counter electrode practice can be summarized with reference to FIG. 1, which provides an illustration of coloration in an electrochromic device having a cathodic counter electrode layer. The overall dynamic range for such a device is given by the net optical density change upon transferring charge from the counter electrode to the electromatic material layer. Such a transfer of charge results in a loss of optical density from the counter electrode and a gain of optical density in the electrochromic material layer. Hence, the net change in optical density is given by the difference in electrochromic efficiency between the electrochromic material layer and the counter electrode. Condition 1 shows a lower overall level of charge and, thus, a lower initial bleached state as compared with Condition 2. On the other hand, Condition 2 shows the situation when the charge capacity is increased, such as by increasing the thickness of the counter electrode layer. As a result, there is an increase in the overall dynamic range along with a concomitant increase in the optical density seen in the bleached state. Therefore, while the total charge of a cathodic counter electrode layer may be increased to enhance the overall dynamic range of the device, the optical density of the counter electrode also increases resulting in a less transparent bleached state.

Devices employing anodic counter electrodes have been briefly discussed in the prior art. Some of these devices employ counter electrodes comprised of nickel oxides doped with tungsten or tantalum. However, the materials comprising such counter electrodes contain the metal oxide in an amorphous phase. As a result, such devices suffer from low coloration efficiencies and low conductivity.

In view of the above problems, there remains a need for improved electrochromic coatings, and in particular electrochromic coatings that comprise solid state, inorganic thin films, and metal oxide thin films. In addition, there remains a need for electrochromic coatings that incorporate complementary anodic and cathodic electrochromic ion insertion layers, whose counter ions are either protons or lithium ions. There also remains a need for improved methods for making complementary electrochromic layers to act as a counter electrode, having improved properties over existing practices. Further, there also remains a need for an electrochromic device with a suitably wide transmission range between fully colored and fully bleached states, with suitably fast coloration and bleaching rates, and with suitable longevity and durability for outdoor architectural applications.

SUMMARY OF THE INVENTION

In accordance with the present invention, these and other objects have now been realized by the discovery of an electrochromic device comprising an anodic complementary counter electrode comprised of a mixed tungsten-nickel oxide and lithium. As such, the electrochromic device of the present invention is comprised of five sequential layers including two conductive layers, an electrochromic layer, an ion conductor layer, and an anodic complementary counter electrode layer.

In accordance with one embodiment of the electrochromic device, the amount of nickel present in the mixed tungsten-nickel oxide ranges from about 15% to about 90% by weight of the mixed oxide. Preferably, the amount of nickel ranges from about 30% to about 70% by weight of the mixed oxide.

Most preferably, the amount of nickel ranges from about 40% to about 60% by weight of the mixed oxide.

In accordance with another embodiment of the electrochromic device, the electrochromic layer is comprised of a metal oxide. In a preferred embodiment, the metal oxide is selected from tungsten oxide, molybdenum oxide, niobium oxide, titanium oxide, copper oxide, iridium oxide, chromium oxide, and manganese oxide. More particularly, the metal oxide is tungsten oxide. In other embodiments, the metal oxide may be doped with one or more metals.

In accordance with another embodiment of the electrochromic device, the conductive layers are comprised of a metal oxide. In a preferred embodiment, the metal oxides of the conductive layers are selected from indium oxide, tin oxide, zinc oxide, and systems based on silver which are well known in the glazing industry. In some embodiments, the metal oxide is doped with one or more metals. More particularly, the metal oxide is indium tin oxide. The electrochromic device of the present invention comprises two conductive layers. As such, each of the conductive layers may be comprised of the same materials or different materials.

In accordance with another embodiment of the electrochromic device, the ion conductor layer is comprised of a lithium-ion conducting layer. Preferably, the lithium-ion conductor layer is comprised of a material selected from the groups consisting of silicates, silicon oxides, and borates.

In accordance with another embodiment of the electrochromic device, the anodic complementary counter electrode has a substantially uniform thickness ranging from about 500 Angstroms to about 6500 Angstroms. Preferably, the thickness ranges from about 1500 Angstroms to about 2500 Angstroms.

In accordance with the present invention, a method has also been discovered for preparing an electrochromic device deposited on a substrate comprising the steps of depositing one of an electrochromic layer or a counter electrode layer comprised of a mixed tungsten-nickel oxide on a first conductive layer, thereby providing a first deposited electrode, depositing an ion-conductor layer on the first deposited electrode, depositing the other of the electrochromic layer or the counter electrode layer on the ion-conductor layer, thereby providing a second deposited electrode, depositing a second conductive layer on the second deposited electrode, and heating the electrochromic device, whereby the mixed tungsten-nickel oxide is reduced through deposition of lithium onto the counter electrode layer immediately following its deposition. In one embodiment, the amount of nickel in the mixed tungsten-nickel oxide ranges from about 15% to about 90% by weight of the mixed oxide. In another embodiment, the amount of nickel ranges from about 30% to about 70% by weight of the mixed oxide. In a preferred embodiment, the amount of nickel ranges from about 40% to about 60% by weight of the mixed oxide.

In accordance with another embodiment of the method of the present invention, lithium is deposited onto the counter electrode in an amount which provides a maximum transmission through the counter electrode. In another embodiment, the amount of lithium deposited onto the counter electrode will be in excess of the amount which provides a maximum transmission through the counter electrode. More particularly, the excess amount of lithium deposited ranges from about 10% to about 40% above the amount which provides a maximum transmission through the counter electrode.

In accordance with another embodiment of the method of the present invention, the electrochromic device is heated to a temperature ranging from about 280° C. to about 500° C. In a preferred embodiment, the electrochromic device is heated to a temperature ranging from about 355° C. to about 395° C.

In accordance with another embodiment of the method of the present invention, the anodic complementary counter electrode layer is deposited by means of physical vapor deposition. More particularly, the anodic complementary counter electrode layer is deposited by means of intermediate frequency reactive sputtering or DC reactive sputtering.

In accordance with another embodiment of the method of the present invention, lithium is deposited on the anodic complementary counter electrode by means of wet chemical methods or by means of physical vapor deposition. In particular, the lithium may be deposited by means of intermediate frequency reactive sputtering or DC sputtering.

Yet another aspect of the present invention is to provide a method of making a counter electrode layer for use in connection with an electrochromic device comprising the steps of depositing a film of a mixed tungsten-nickel oxide on a substrate, reducing the mixed tungsten-nickel oxide film by depositing lithium on the film, and heating the counter electrode layer.

Applicants have found that an electrochromic device utilizing an anodic counter electrode comprised of a mixed tungsten-nickel oxide provides a suitably wide transmission range between the fully colored and fully bleached states. Moreover, such a device has found to be capable of reversibly intercalating several tens of millicoulombs per square centimeter of charge in the form of ions and charge compensating electrons. Further, applicants have discovered that an anodic counter electrode comprised of a mixed tungsten-nickel oxide provides a complementary response upon insertion of charge. Finally, applicants have discovered that an electrochromic device employing such a mixed tungsten-nickel oxide has improved transmission in the lithiated counter electrode layer when such device is heated.

DETAILED DESCRIPTION

One object of the present invention is to provide an electrochromic device having an anodic complementary counter electrode which provides a high transmission in the fully intercalated state and is capable of long term stability suitable for use as a commercial product.

This and other objectives are realized by means of an electrochromic device utilizing an anodic complementary counter electrode comprised of a mixed tugsten-nickel oxide which is capable of reversibly intercalating several tens of millicoulombs of charge per square centimeter, in the form of lithium ions and charge compensating electrons, and that upon intercalation of such ions, results in a high transmission in the fully intercalated state.

Another objective of the present invention is to provide a method of preparing an anodic complementary counter electrode layer for use in connection with an electrochromic device comprising a mixed tungsten-nickel oxide.

Another objective of the present invention is to provide a method of preparing an electrochromic device comprising an anodic complementary counter electrode comprised of a mixed tungsten-nickel oxide.

The shortcomings of the prior art, particularly those associated with cathodic counter electrodes (i.e. having to choose between a wide dynamic range or a counter electrode having a high bleached state transmission), are overcome through the use of an anodic complementary counter electrode as described herein. The dynamic range of an electrochromic device employing such an anodic complementary counter electrode allows the device's dynamic range to be increased simply by increasing the amount of charge transferred, provided the amount of charge in the counter electrode is controlled well enough to maintain high transparency.

Figure 1:
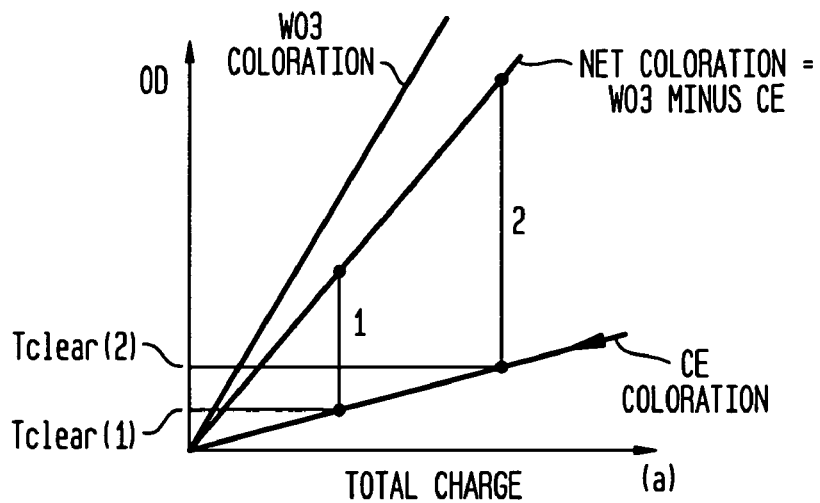
FIG. 1 is a graph detailing the coloration of an electrochromic device having a cathodic counter electrode layer.
Figure 2:
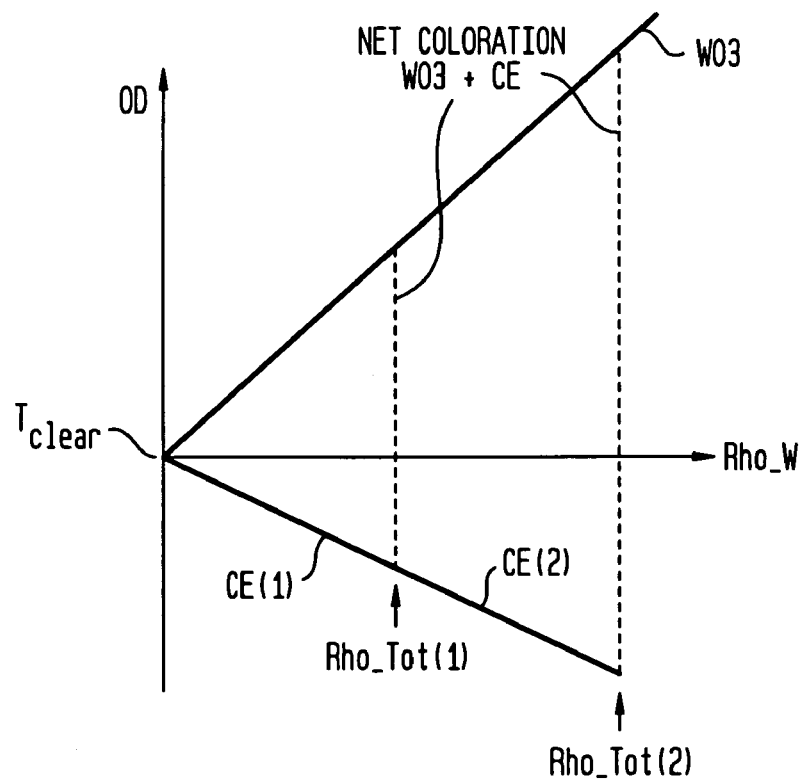
FIG. 2 is a graph detailing the coloration of an electrochromic device having an anodic counter electrode layer.

FIG. 2 illustrates the coloration of an electrochromic device utilizing an anodic complementary counter electrode layer having an increased dynamic range and a high initial bleached state in comparison to a cathodic counter electrode. Unlike in FIG. 1, the dynamic range in FIG. 2 is given by the sum of the electrochromic efficiencies of the counter electrode and the electrochromic material layers. The net result is that the dynamic range may be increased simply by increasing the amount of charge transferred to the anodic complementary counter electrode layer. Condition 1 and Condition 2 are different in that the anodic counter electrode in Condition 1 holds a lower amount of charge as compared with the anodic counter electrode in Condition 2. However, the lower amount of charge in Condition 1 as compared with Condition 2 does not lead to a compromise in the bleached state optical density. Increasing the thickness of the anodic counter electrode, as demonstrated by Condition 2, increases the overall dynamic range of the device without changing the initial bleached state optical density.

Prior to describing the invention further, some definitions will be helpful.

As used herein, the term "bleached state" means the state of an electrochromic material that is at least partially clear or at least partially non-colored.

As used herein, the term "intercalation" means the reversible insertion of a molecule, atom or ion into a crystal lattice.

As used herein, the term "lithium" means elemental lithium, its salts, oxides, coordination complexes, and chelates. "Lithium" may also refer to lithium ions.

As used herein, the term "sputtering" means a physical process whereby atoms in a solid target material are ejected into the gas plasma phase due to bombardment of the material by energetic ions. "Sputtering" will be discussed with regard to its use in film deposition.

Figure 3:
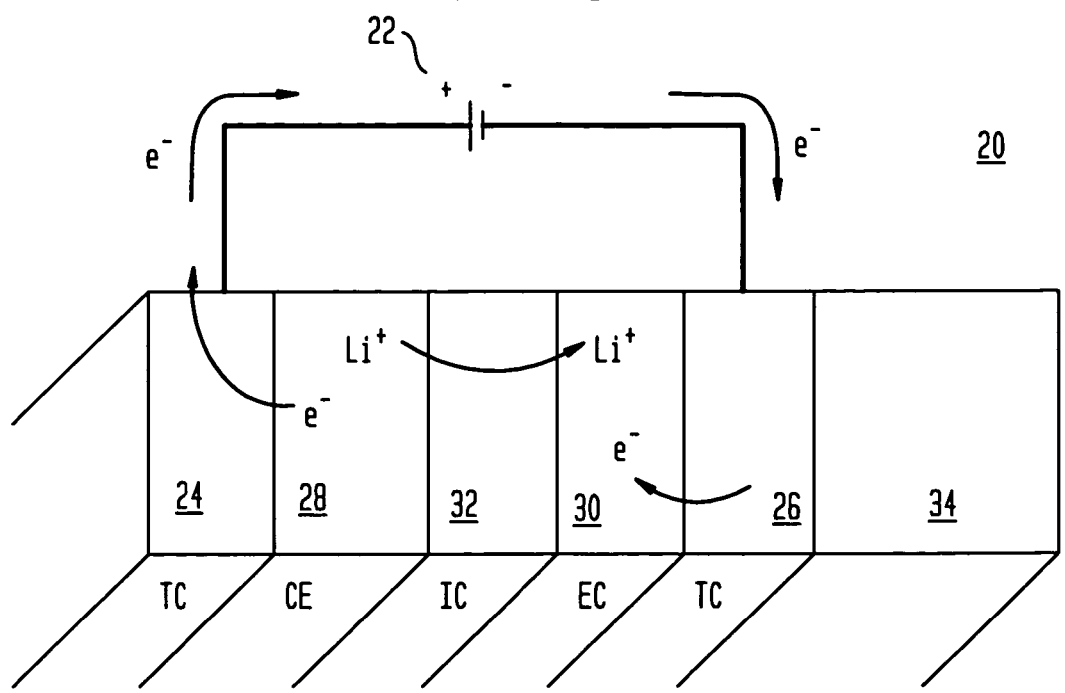
FIG. 3 is a schematic cross-section of a five layer electrochromic device in accordance with one embodiment of the current invention.

FIG. 3 shows a five layer electrochromic device in cross-section. In order for such a five-layer electrochromic device to function correctly, it is necessary to have at least the following sequential layers: an electrochromic layer ("EC") 30 which produces a change in absorption or reflection upon oxidation or reduction; an ion conductor layer ("IC") 32 which serves as an electrolyte, allowing the passage of ions while blocking electronic current; a counter electrode ("CE") 28 which serves as a storage layer for ions when the device is in the bleached state; and two conductive layers ("CL") 24 and 26 which serve to apply an electrical potential to the electrochromic device. Each of the aforementioned layers are applied sequentially on a substrate 34.

A low voltage electrical source 22 is connected to the device by means of conductive wires. In order to alter the optical properties of window 20, it is necessary that an electrical potential be applied across the layered structure. The polarity of the electrical source will govern the nature of the electrical potential created and, thus, the direction of ion and electron flow. In the embodiment depicted in FIG. 3, the electrical potential created will cause ions to flow from the counter electrode layer 28 through the ion conductor layer 32 to the electrochromic layer 30, thereby causing the electrochromic layer 30 to transform to the colored state thereby causing the transparency of the window 20 to be reduced.

The materials employed for the conductive layers 24 and 26 are well known to those skilled in the art. Exemplary conductive layer materials include coatings of indium oxide, indium tin oxide, doped indium oxide, tin oxide, doped tin oxide, zinc oxide, doped zinc oxide, ruthenium oxide, doped ruthenium oxide and the like, as well as all thin metallic coatings that are substantially transparent, such as transition metals including gold, silver, aluminum, nickel alloy, and the like. It is also possible to employ multiple layer coatings, such as those available from Pilkington under the tradename of TEC-Glass®, or those available from PPG Industries under the tradenames SUNGATE® 300 and SUNGATE® 500. The conductive layers 24 and 26 may also be composite conductors prepared by placing highly conductive ceramic and metal wires or conductive layer patterns on one of the faces of the substrate and then overcoating this with transparent conductive materials such as indium tin oxide or doped tin oxides. The conductive layers may be further treated with appropriate anti-reflective or protective oxide or nitride layers.

In some embodiments, the material selected for use in conductive layer 26 is the same as the material selected for use in conductive layer 24. In other embodiments, the material selected for use in conductive layer 26 is different than the material selected for use in conductive layer 24.

Preferably, the conductive layers utilized in the present invention are transparent layers of indium tin oxide. Typically, the conductive layer 26 is disposed on a substrate having suitable optical, electrical, thermal, and mechanical properties such as, for example, glass, plastic or mirror materials, as a coating having a thickness in the range of about 5 nm to about 10,000 nm, and preferably about 10 nm to about 1,000 nm. However, any thickness of the conductive layer may be employed that provides adequate conductance for the electrochromic device and which does not appreciably interfere with the transmission of light where required. Moreover, conductive layer 24 is typically the final layer of the electrochromic device deposited on the counter electrode layer 28. Other passive layers used for improving optical properties, or providing moisture or scratch resistance may be deposited on top of the active layers. These conductive layers are connected to an electrical power source in a conventional manner.

The electrochromic layer 30 employed as part of the present invention is well known to those skilled in the art. The electrochromic layer may be comprised of materials including inorganic, organic blends and/or composites of inorganic and organic electrochemically active materials such that the EC layer is capable of receiving ions transferred from the CE layer 28. Exemplary inorganic metal oxide electrochemically active materials include $WO_3$, $V_2O_5$, $MoO_3$, $Nb_2O_5$, $TiO_2$, $CuO$, $Ni_2O_3$, $Ir_2O_3$, $Cr_2O_3$, $Co_2O_3$, $Mn_2O_3$, mixed oxides (e.g $W$—$Mo$ oxide, $W$—$V$ oxide) and the like. One skilled in the art would recognize that each of the aforementioned metal oxides may be appropriately doped with lithium, sodium, potassium, molybdenum, vanadium, titanium, and/or other suitable metals or compounds containing metals. In a preferred embodiment, the EC layer 30 is selected from $WO_3$ or doped $WO_3$.

The thickness of the EC layer 30 may vary depending on the electrochemically active material chosen. However, the EC layer 30 typically ranges from about 500 Angstroms to about 20,000 Angstroms in thickness, preferably from about 3400 Angstroms to about 4200 Angstroms.

Overlying the electrochromic layer 30 is an ion conductor layer 32. The ion conductor layer 32 employed as part of the present invention is comprised of a solid electrolyte capable of allowing ions to migrate through the layer. The ion conductor layer 32 must have a sufficient ionic transport property to allow ions, preferably lithium ions, to migrate through. Any material may be used for an ion conductor provided it allows for the passage of ions from the counter electrode layer 28 to the electrochromic layer 30. In some embodiments, the ion conductor layer comprises a silicate-based structure. In other embodiments, suitable ion conductors particularly adapted for lithium ion transmission include, but are not limited to, lithium silicate, lithium aluminum silicate, lithium aluminum borate, lithium borate, lithium zirconium silicate, lithium niobate, lithium borosilicate, lithium phosphosilicate, lithium nitride, lithium aluminum fluoride, and other such lithium-based ceramic materials, silicas, or silicon oxides. Other suitable ion-conducting materials can be used, such as silicon dioxide or tantalum oxide. Preferably, the ion conductive layer 32 has low or no electronic conductivity. The preferred ion conductor material is a lithium-silicon-oxide produced by either sputtering or a sol-gel process.

The thickness of the IC layer 32 may vary depending on the material. However, the IC layer 32 typically ranges from about 100 Angstroms to about 700 Angstroms in thickness, preferably from about 200 Angstroms to about 600 Angstroms in thickness, and most preferably from about 325 Angstroms to about 475 Angstroms in thickness.

The counter electrode layer 28 utilized in the electrochromic device of the present invention is an anodic complementary counter electrode. The counter electrode layer 28 is considered anodic because it is anodically electrochromic, meaning that it will become more transparent when reduced (i.e. when ions are intercalated), which is the opposite of more common electrochromic materials such as tungsten oxides. As a result of the counter electrode 28 being transparent in the charged state, the counter electrode may act as a complementary electrochromic layer, causing the electrochromic device to color both from oxidation of the counter electrode and reduction of the electrochromic layer 28. Thus, when charge (in the form of ions and electrons) is removed from the complementary counter electrode 28 of the present invention, the layer will turn from a transparent state to a colored state.

The complementary counter electrode layer 28 of the present invention is comprised of a mixed tungsten-nickel oxide capable of storing ions and then releasing these ions for transfer to the electrochromic layer 30 in response to an appropriate electrical potential. In one embodiment, the mixed oxide has the form of a $Ni_2O_3$ and $WO_3$ composite. In another embodiment, the amount of nickel present in the mixed tungsten-nickel oxide ranges from about 15% to about 90% by weight of said mixed tungsten-nickel oxide, preferably from about 30% to about 70% by weight of said tungsten-nickel oxide, and most preferably from about 40% to about 60% by weight of said tungsten-nickel oxide. When charge is removed from the mixed tungsten-nickel oxide, the CE layer 28 will turn from a transparent state to a brown colored state.

In some embodiments, the mixed tungsten-nickel oxide is present in an amorphous state. In other embodiments, the mixed tungsten-nickel oxide is present in a crystalline state. In yet other embodiments, the mixed tungsten-nickel oxide may be present in a mixed amorphous and crystalline state. However, in preferred embodiments, the mixed tungsten-nickel oxide is present substantially in crystalline form. Without wishing to be bound by any particular theory, in some preferred embodiments, separate domains of different crystalline metal oxides may be present as an admixture (i.e. an admixture of crystalline tungsten oxide and crystalline nickel oxide). Again, without wishing to be bound by any particular theory, in other preferred embodiments, separate domains of a crystalline metal oxide and an amorphous metal oxide may be present (e.g. an admixture of amorphous nickel oxide and crystalline tungsten oxide, or an admixture of amorphous tungsten oxide and crystalline nickel oxide).

The thickness of the complementary counter electrode layer 28 is variable depending on the application sought for the electrochromic device and the transmission range desired. As such, the thickness may range from about 500 Angstroms to about 6500 Angstroms. In one embodiment of the present invention, the thickness ranges from about 1500 Angstroms to about 2500 Angstroms, preferably ranging from about 1750 Angstroms to about 2050 Angstroms in thickness.

The complementary counter electrode layer 28 of the present invention is also comprised of lithium. In one embodiment of the present invention, the lithium comprising the CE 28 is at least partially intercalated within the mixed tungsten-nickel oxide. In another embodiment, the lithium is present as a film at least partially coating the surface of the CE. The lithium present in the CE 28, either on the CE surface and/or intercalated within the mixed tugsten-nickel oxide, is capable of being reversibly transferred from the CE to the EC 30 when an electrical potential is applied.

Typically the substrate 34 of the electrochromic device is comprised of transparent glass or plastic such as, for example, acrylic, polystyrene, polycarbonate, allyl diglycol carbonate [CR39 available from PPG Industries, Pittsburgh, Pa.], SAN [styrene acrylonitrile copolymer], poly(4-methyl-1-pentene), polyester, polyamide, etc. It is preferable for the transparent substrate 34 to be either clear or tinted soda lime glass, preferably float glass. If plastic is employed, it is preferably abrasion protected and barrier protected using a hard coat of, for example, a silica/silicone anti-abrasion coating, a diamond-like protection coating or their like, such as is well known in the plastic glazing art. Generally, the substrates have a thickness in the range of about 0.01 mm to about 10 mm, and preferably in the range from about 0.1 mm to 5 mm. However, any substrate of any thickness which will provide a functioning electrochromic device may be employed.

It will be appreciated that the complementary counter electrode layer 28 and the electrochromic layer 30 may be reversed in the overall structure of FIG. 3. However, if the CE layer 28 and the EC layer 30 are reversed, the polarity of the applied potential must be adjusted to ensure that the correct polarity for the layers is maintained.

In a preferred embodiment of the invention, the completed device of FIG. 3 is subjected to a heat treatment process, carried out subsequent to the fabrication of the device. A device subjected to such treatment has improved conductivity, an increased conductive layer transparency, and an increased transmission of the lithiated CE layer. Moreover, when heated, the lithiated mixed tungsten-nickel oxide may transform into a composite of $Li_2WO_4$ and $Ni_2O_3$.

The electrochromic device described herein could be coupled with radiation sensors (e.g., visible and solar) and energy management systems to automatically control their transmission and reflection.

The electrochromic device of the present invention may be powered with solar cells, thermoelectric sources, wind generators, etc., to make them self-sustaining. These may be also coupled into charge storage devices such as batteries, re-chargeable batteries, capacitors or other means. The charge storage devices could be utilized as automatic backup power source when primary source of power is interrupted.

The electrochromic device of the present invention may also be used as filters in displays or monitors for reducing the ambient light intensity, e.g., sun glare, that is incident on the monitor or display surface. Thus, the device may be employed to enhance the image quality of displays and monitors, particularly in well lit conditions.

These electrochromic devices may also be used as displays having an advantageously wide viewing area with a high contrast because no polarizers are required as are in conventional liquid crystal displays The electrochromic device of the present invention may also be used as eyewear or sunglasses.

A method of preparing an electrochromic device employing an anodic complementary counter electrode is also provided. A first conductive layer 26 is deposited on substrate 34 by methods known in the art and in accordance with the desired properties of a conductor layer as previously mentioned.

An electrochromic layer 30 is then deposited on conductor layer 26 through wet chemical methods, chemical vapor deposition and/or physical vapor deposition (e.g. sol-gel, metallo-organic decomposition, laser ablation, evaporation, e-beam assisted evaporation, sputtering, intermediate frequency reactive sputtering, RF sputtering, magnetic sputtering, DC sputtering, PVD and CVD and the like). In preferred embodiments, the electrochromic layer 30 is deposited via intermediate frequency reactive sputtering or DC sputtering techniques. In one embodiment, the EC layer 30 is deposited on a heated first conductor layer 26.

The deposited electrochromic layer 30 may be comprised of metal oxides including titanium oxides, vanadium oxides, tungsten oxides, molybdenum oxides, or doped variants thereof. In a preferred embodiment, the electrochromic layer 30 deposited is comprised of $WO_3$. In some embodiments, the deposited $WO_3$ may contain a stoichiometric excess or deficiency of oxygen, depending on the deposition method and conditions chosen. In other embodiments, the $WO_3$ may be doped with an appropriate metal or metallic compound.

An ion conductor layer 32 is then deposited on EC layer 30 through wet chemical methods, chemical vapor deposition and/or physical vapor deposition (e.g. sol-gel, metallo-organic decomposition, laser ablation, evaporation, e-beam assisted evaporation, sputtering, intermediate frequency reactive sputtering, RF sputtering, magnetic sputtering, DC sputtering, PVD and CVD and the like). In a preferred embodiment, the ion conductor layer is deposited via a sol gel method or reactive sputtering.

An anodic complementary counter electrode layer 28 comprised of a film of a mixed tungsten-nickel oxide is then deposited on the IC layer 32 through physical vapor deposition, intermediate frequency reactive sputtering, DC sputtering, or RF-magnetron sputtering. In one embodiment, tungsten chips are placed on a nickel target with the sputtering pressure set between 1 mTorr and 10 mTorr by introducing oxygen or argon into the chamber. In another embodiment, powdered tungsten-nickel metals or oxides are hot pressed or hot isostatically pressed (HIPed) and utilized as a sputtering target in an oxygen rich or argon rich atmosphere.

After the deposition of the mixed tungsten-nickel oxide film, the tungsten-nickel oxide film is reduced through the deposition of lithium. The deposition of the lithium is achieved through one of either wet chemical methods, sol-gel, chemical vapor deposition, physical vapor deposition, or reactive sputtering. In a preferred embodiment, the source of the lithium deposited on the tungsten-nickel oxide film is lithium metal deposited in vacuum using a non-reactive sputtering process.

In one embodiment, the amount of lithium deposited on the mixed tungsten-nickel oxide film is carefully controlled such that an amount of lithium is added that allows for the greatest transmission of light through the counter electrode layer 28, and hence the whole device.

Figure 4:
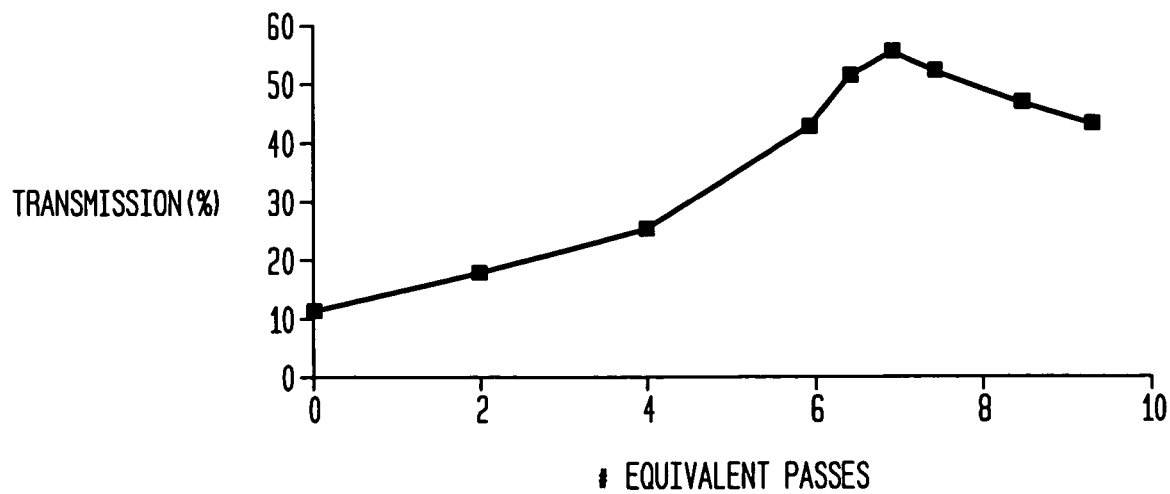
FIG. 4 is a graph detailing the transmission level of a partially completed electrochromic device during the deposition of lithium into the anodic counter electrode.

Typical results for the optical measurements of the electrochromic device are shown in FIG. 4, where the measured transmission is plotted as a function of the amount of intercalated lithium. The percent transmission, which is dominated by the absorption of the counter electrode, starts out low and increases as the charge, in the form of lithium ions, is intercalated. At higher levels of intercalated lithium, the transmission proceeds through a maximum and then begins to decrease when additional lithium is added beyond the maximum. The amount of charge necessary to obtain the maximum transmission of the device, measured in-situ, is utilized as a process control parameter to ensure the correct level of lithium is deposited, and ultimately intercalated onto or into the mixed tungsten-nickel oxide film.

It should also be noted that the starting transmission for the counter electrode depends on the thickness of the mixed tungsten-nickel oxide film and the absorption coefficient, which is dependent on the tungsten-nickel ratio and the oxidation state of the material. Moreover, it has been shown that a higher transmission is obtained for a more tungsten rich film and also for a more reduced film.

In another embodiment, the amount of lithium deposited onto the counter electrode layer 28 is in excess of the amount required to achieve the maximum transmission, such that the greatest transmission is still achieved as and when the excess lithium is lost during subsequent processing steps. If excess lithium is deposited, such amount of excess lithium ranges from about 10% to about 40% above that required to achieve the maximum transmission. The amount of excess lithium added, however, ultimately depends on the CE layer 28 thickness and the requirements for the electrochromic device's performance.

A second conductive layer 24 is deposited on the lithiated CE layer 28 by methods well known in the art and as described above in the deposition of the first conductive layer 26.

The device is completed by heating the entire electrochromic device in a vacuum, an inert atmosphere, or an atmospheric oven. It has been determined that in order to obtain a suitably uniform device after processing, there is a trade-off between the heating time and the size, e.g. larger windows require a longer time to heat up. It is also observed that the process can be achieved by heating at a lower temperature for a shorter time. In other words, there appears to be a requirement that the time-temperature product is approximately constant. Devices with sizes suitable for use in glazing products should be heated to a temperature ranging from about 280° C. to about 500° C., preferably to a temperature ranging from about 355° C. to about 395° C. The device may be heated for a time ranging from about 1 minute to about 120 minutes, preferably from about 10 minutes to about 30 minutes. Smaller devices, for other applications such as variable transmission filters for cameras and the like, can be heated much more rapidly, as the stringent requirements for uniformity are somewhat reduced.

In another embodiment, the device can be heated prior to the second conductive layers being deposited. This method results in electrochromic device properties substantially the same as those discussed in the preceding embodiment, but allows for the heating to be done in the same process chamber as the deposition, possibly resulting in improved process flow.

The heat treatment process has a positive effect on the switching characteristics of the electrochromic device, as well as improving the conductivity and transparency of the second conductive layer 26. The heat treatment also has the effect of increasing the transmission of the lithiated CE layer 28.

As already mentioned, the position of the complementary counter electrode layer 28 and the electrochromic layer 30 may be reversed in the overall structure presented in FIG. 3. One skilled in the art would appreciate that should the layers be reversed, the method of manufacturing the device does not change with regard to the steps that have to be performed to generate each layer. Regardless of the order of steps performed to form an electrochromic device employing the aforementioned complementary counter electrode, the device may still be subjected to the heat treatment process described herein.

One skilled in the art would appreciate that the methods utilized above to create a complementary counter electrode comprised of a mixed tungsten-nickel oxide may be used to develop a counter electrode for use in connection with any electrochromic device. That is, the methods used to develop the complementary counter electrode are not limited to use in the specific electrochromic device discussed herein. Moreover, the method of making the complementary counter electrode discussed above may also be used to deposit a complementary counter electrode on any surface, not merely ion conductor layers or other conductive layers.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A heat treated electrochromic device comprising:
   a) a first electrode comprising one of a cathodic electrochromic layer or an anodic counter electrode layer,
   b) a second electrode comprising the other of said cathodic electrochromic layer or said anodic counter electrode layer,
   c) an ion-conductor layer for conducting ions between said first and second electrodes,
   d) a first conductive layer, and
   e) a second conductive layer,
   said first and second electrodes and said ion-conductor layer being sandwiched between said first and second conductive layers,
   said anodic counter electrode layer comprising lithium and a mixed tungsten-nickel oxide substantially in crystalline form, and
   wherein the amount of nickel in said mixed tungsten-nickel oxide ranges from 15% to 90% by weight of said mixed tungsten-nickel oxide.

2. The electrochromic device of claim 1, wherein said amount ranges from about 30% to about 70% by weight of said mixed tungsten-nickel oxide.

3. The electrochromic device of claim 2, wherein said amount ranges from about 40% to about 60% by weight of said mixed tungsten-nickel oxide.

4. The electrochromic device of claim 1, wherein said cathodic electrochromic layer comprises a metal oxide.

5. The electrochromic device of claim 4, wherein said metal oxide is selected from the group consisting of tungsten oxide, vanadium oxide, molybdenum oxide, niobium oxide, titanium oxide, copper oxide, iridium oxide, chromium oxide, and manganese oxide.

6. The electrochromic device of claim 4, wherein said metal oxide is doped with one or more metals.

7. The electrochromic device of claim 1, wherein said first and second conductive layers comprise a metal oxide.

8. The electrochromic device of claim 7, wherein said metal oxide is selected from the group consisting of indium oxide, tin oxide, zinc oxide, and ruthenium oxide.

9. The electrochromic device of claim 7, wherein said metal oxide is doped with one or more metals.

10. The electrochromic device of claim 7, wherein said conductive layers comprise the same metal oxide.

11. The electrochromic device of claim 7, wherein said conductive layers comprise different metal oxides.

12. The electrochromatic device of claim 1, wherein said first and second conductive layers comprise a substantially transparent coating of a transition metal.

13. The electrochromic device of claim 1, wherein said ion conductor layer comprises a lithium-ion conducting layer.

14. The electrochromic device of claim 13, wherein said lithium-ion conducting layer comprises a material selected from the groups consisting of silicates, silicon oxides, and borates.

15. The electrochromic device of claim 1, disposed on a substrate selected from the group consisting of glass or plastic.

16. The electrochromic device of claim 1, wherein said anodic counter electrode has a substantially uniform thickness ranging from about 500 Angstroms to about 6500 Angstroms.

17. The electrochromic device of claim 16, wherein said thickness ranges from about 1500 Angstroms to about 2500 Angstroms.

18. A heat treated electrochromic device comprising:
   a) a first electrode comprising one of a cathodic electrochromic layer or an anodic counter electrode layer,
   b) a second electrode comprising the other of said cathodic electrochromic layer or said anodic counter electrode layer,
   c) a lithium ion-conducting layer for conducting ions between said first and second electrodes, wherein said lithium ion-conducting layer comprises material selected from the group consisting of silicates, silicon oxides, and borates,
   d) a first conductive layer, and e) a second conductive layer, said first and second electrodes and said ion-conductor layer being sandwiched between said first and second conductive layers, and said anodic counter electrode layer comprising lithium and a mixed tungsten-nickel oxide substantially in crystalline form.

19. The heat treated electrochromic device of claim 18, wherein an amount of nickel in said tungsten-nickel oxide ranges from about 15% to about 90% by weight of said mixed tungsten-nickel oxide.

20. A heat treated electrochromic device comprising:

a) a first electrode comprising one of a cathodic electrochromic layer or an anodic counter electrode layer, b) a second electrode comprising the other of said cathodic electrochromic layer or said anodic counter electrode layer, c) an ion-conductor layer for conducting ions between said first and second electrodes, d) a first conductive layer containing a first metal oxide, and e) a second conductive layer containing a second metal oxide, wherein said first and second metal oxides are different, said first and second electrodes and said ion-conductor layer being sandwiched between said first and second conductive layers, and said anodic counter electrode layer comprising lithium and a mixed tungsten-nickel oxide substantially in crystalline form.

21. The heat treated electrochromic device of claim 20, wherein an amount of nickel in said tungsten-nickel oxide ranges from about 15% to about 90% by weight of said mixed tungsten-nickel oxide.

* * * * *